(12) United States Patent
Artusi

(10) Patent No.: US 10,514,557 B2
(45) Date of Patent: Dec. 24, 2019

(54) FRAME FOR SPECTACLES

(71) Applicant: SAFILO SOCIETÀ AZIONARIA FABBRICA ITALIANA LAVORAZIONE OCCHIALI S.P.A., Padua (IT)

(72) Inventor: Ampelio Artusi, Padua (IT)

(73) Assignee: SAFILO-SOCIETÀ AZIONARIA FABBRICA ITALIANA LAVORAZIONE OCCHIALI S.P.A., Padua (IT)

( * ) Notice: Subject to any disclaimer, the term of this patent is extended or adjusted under 35 U.S.C. 154(b) by 131 days.

(21) Appl. No.: 15/759,464

(22) PCT Filed: Oct. 7, 2016

(86) PCT No.: PCT/EP2016/073961
§ 371 (c)(1),
(2) Date: Mar. 12, 2018

(87) PCT Pub. No.: WO2017/063946
PCT Pub. Date: Apr. 20, 2017

(65) Prior Publication Data
US 2018/0252939 A1 Sep. 6, 2018

(30) Foreign Application Priority Data
Oct. 12, 2015 (IT) .................. 102015000060759

(51) Int. Cl.
*G02C 5/22* (2006.01)
*G02C 5/14* (2006.01)
(52) U.S. Cl.
CPC ............ *G02C 5/2272* (2013.01); *G02C 5/14* (2013.01); *G02C 5/2254* (2013.01)

(58) Field of Classification Search
None
See application file for complete search history.

(56) References Cited

U.S. PATENT DOCUMENTS

2007/0211210 A1* 9/2007 Proksch .................. G02C 1/08
351/121
2013/0229613 A1* 9/2013 Carpenter ............. G02C 5/008
351/113

FOREIGN PATENT DOCUMENTS

DE 202009016605 U1 4/2010
DE 202011051142 U1 11/2011
FR 1009345 A 5/1952
JP 2011095691 A 5/2011
(Continued)

*Primary Examiner* — Ricky L Mack
*Assistant Examiner* — Gary W O'Neill
(74) *Attorney, Agent, or Firm* — Volpe and Koenig, P.C.

(57) ABSTRACT

A frame for spectacles comprises a front mount (2) having respective lateral lugs (4) which are provided for the articulation of respective arms (5) for the purpose of producing the articulated connection of each arm (5) to the front mount (2); each lug (4) comprises a first lug portion (4a) which extends into a second lug portion (4b) which is folded on the first portion in a position facing the first portion, the second portion (4b) comprising a first through-opening (8) which is laterally delimited by a pair of opposing wings (9a, 9b) which are spaced apart from each other, the wings being connected at the free end of the second lug portion (4b) by a cross-member (10), an extension piece (11) which extends from the cross-member (10) inside the opening (8) and in the direction of the first lug portion (4a).

13 Claims, 11 Drawing Sheets

(56) References Cited

FOREIGN PATENT DOCUMENTS

| WO | 2011108824 | A2 | 9/2011 |
|----|------------|----|--------|
| WO | 2012102579 | A2 | 8/2012 |

\* cited by examiner

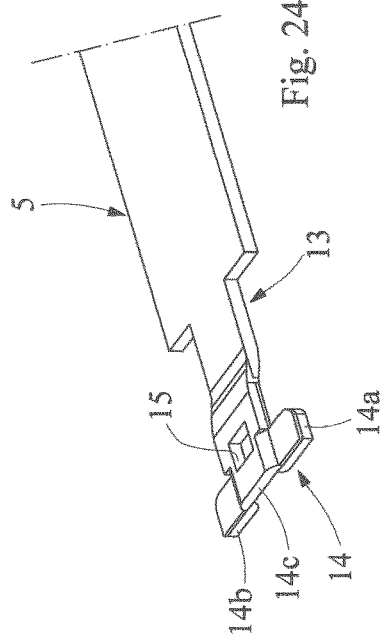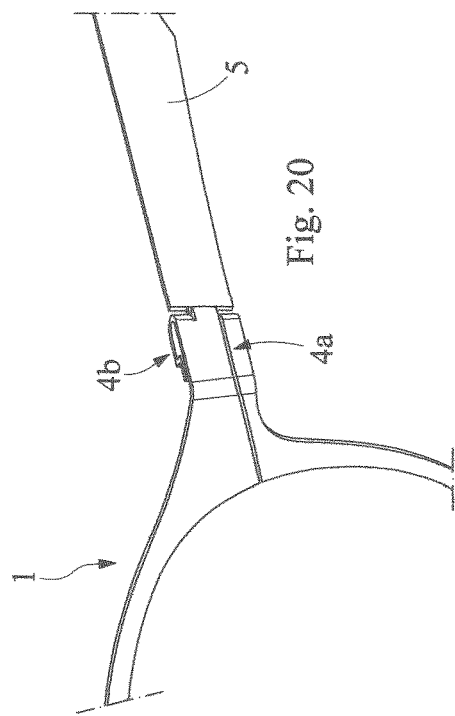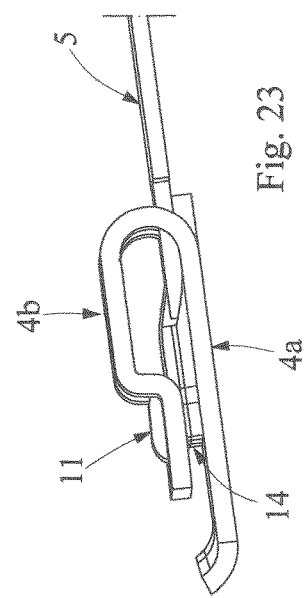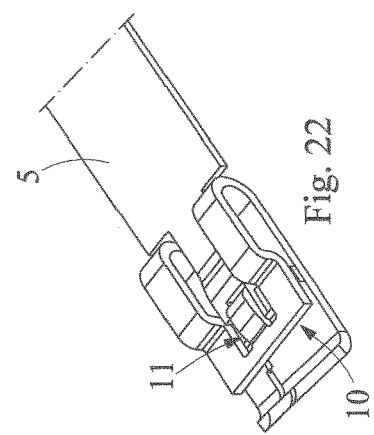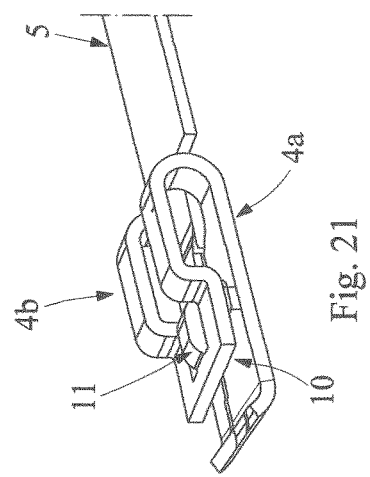

FRAME FOR SPECTACLES

TECHNICAL FIELD

The present invention relates to a frame for spectacles having the features set out in the preamble of main claim 1.

TECHNOLOGICAL BACKGROUND

In the specific technical field, there are well-known frames for spectacles in which the articulation of the arms to the front mount is carried out by means of hinge devices having respective pins and eye-like seats which are associated with each other in a rotatable manner, the hinge elements of those devices being fixedly joined suitably to the arm and the lug of the frame.

That type of solution, in the multiple versions thereof available in the prior art, conventionally involves some limitations, including the possible undesirable loosening of the screw or the hinge pin, the need to produce a plurality of components which are required for the hinge articulation, the spatial requirement dictated by the necessary components, and the weight itself of the hinge device which is not very suitable for use in frames of the lightweight type.

There are further known solutions for the articulation of the arm to the front lug of the frame which do not provide for any conventional hinge structure of the above-mentioned type. An example is known from FR 1009345, in which there is described a system for the articulation with resilient locking of the arm to the lug. It provides for the arm end directed towards the front lug to be divided into three separate portions over a sufficient length to provide them with a mutual resilient behaviour. The folded end of the central portion together with the lateral portions retain the arm in an articulated manner about a pin-like formation which is provided on the frame.

Another type of solution is set out in JP 2011/095691, in which one or more elongate elements produced from a resilient sheet are formed, by cutting, at the end of the arm directed towards the lug and are provided to engage with the folded ends thereof with corresponding through-openings formed through the lug portion, thereby producing the retention in an articulated manner of the arm with respect to the lug of the frame.

However, both those last solutions involving articulation of the arm have some limitations. In the first place, the connection of the arm to the lug is not particularly stable, in all the positions of the arm between the extreme opening and closure conditions on the frame, in particular the arm tends to have a relative movement with respect to the lug (transversely to the front plane of the frame when the arm is open), bringing about a type of relative oscillation between the arm and the lug, which may, in addition to not being technically acceptable as a result of the poor stability of the connection and the excessive play of the connection which it involves, also compromise the wearing comfort of the frame.

Another limitation is linked with the fact that the arm can be exposed to accidental disconnection from the lug, mainly owing to the fact that the relative connection forces are generated exclusively by the resilient urging of the sheet-like element formed on the arm. A possible accidental impact or pulling action of such a magnitude as to overcome the resilient connection force may bring about the disarticulation of the arm from the lug with detachment thereof from the frame.

DESCRIPTION OF THE INVENTION

A main object of the invention is to produce a frame for spectacles with articulation means of the frame with respect to the front of the frame, which frame is structurally and functionally configured to overcome the limitations set out with reference to the known solutions, and in particular which has in relation to the articulation means of the arms a structure which is easy to assemble on the frame, is particularly light and has a limited spatial requirement so as to be able to also be used in frames which are particularly slender and light, but which at the same time ensures a high level of stability of the relative connection both during the movement of the arm and in the extreme opening and closure positions thereof on the frame.

This object and other objects which will be better appreciated below are achieved by a frame for spectacles which is produced in accordance with the appended claims.

BRIEF DESCRIPTION OF THE DRAWINGS

Additional features and advantages of the invention will be better appreciated from the following detailed description of some preferred embodiments thereof which are illustrated by way of non-limiting example with reference to the appended drawings, in which:

FIG. 20 is a view corresponding to that of FIG. 2 in accordance with a third embodiment of the invention, FIGS. 21 to 23 are perspective views, drawn to an enlarged scale, of the detail shown in FIG. 20, FIG. 24 is a partial perspective view of one of the components of the detail of FIGS. 20 to 23, FIGS. 25 to 30 are partial front elevations of one of the components of the detail of the frame of the preceding Figures, in respective and different embodiments, shown in an intermediate construction step.

PREFERRED EMBODIMENTS OF THE INVENTION

Figure 1:
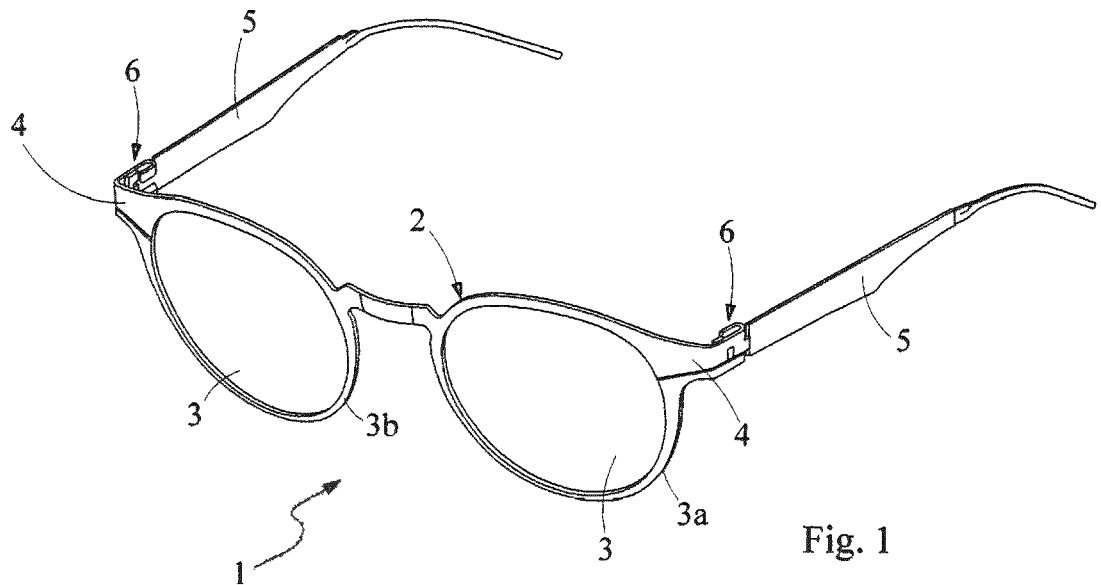
FIG. 1 is a perspective view of a frame for spectacles which is produced in accordance with a first embodiment of the present invention.
Figure 2:
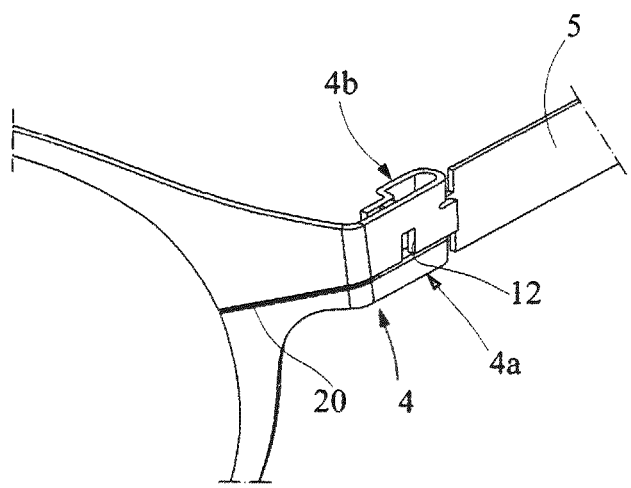
FIG. 2 is a partial perspective view, drawn to an enlarged scale, of a detail of the frame of the preceding Figure, with respect to the articulation of one of the arms to the relevant front lug of the frame.

With reference to the cited Figures, there is generally designated 1 a frame for spectacles which is constructed in accordance with a first embodiment of the present invention, comprising a front mount 2 which is for retaining lenses 3 and which is provided with a pair of opposing lateral lugs 4 which are provided for the articulated connection of respective arms 5 to the front mount.

For the articulated connection of each arm 5 to the corresponding lug 4, the frame comprises respective articulation means which are generally designated 6 and which are suitable for allowing the rotation between corresponding opening and closure positions of the arm with respect to the front mount.

As a result of the structural and functional identity, there will be described in detail below the articulation means of only one of the arms 5 with respect to the front mount 2 of the frame.

As can be seen in the Figures, the arms 5 and the corresponding lugs 4 have a preferred plate-like formation with a small thickness. In other words, the cross-section of the arm (and of the corresponding lug) has a dimension of the height of the arm, measured substantially parallel with the temporal zone of the head with the spectacles on, far greater than the thickness of the arm measured transversely to the height. The formation of the cross-section having a small thickness, together with the selection of materials from which it is constructed, preferably metal materials, generally confers on the arm characteristics of great lightness with reduced dimensions for a longitudinal extent of the arm which is particularly slender, and so as to further confer on the frame a general design having a substantial aesthetic impact. In this regard, a sheet metal structure is particularly suitable in the formation of the arms and the front mount of the frame.

In accordance with the plate-like structure mentioned above, the transverse thickness of the arm 5 is defined between opposing lateral faces 6a, 6b thereof, while the thickness of the corresponding lug 4 is similarly delimited between opposing lateral faces 7a, 7b of the lug itself.

Advantageously, the lug 4 is constructed in one piece with the front mount 2 of the frame and comprises a first lug portion 4a which extends into a second lug portion 4b, the second lug portion being folded onto the first portion 4a so as to face it (with the faces 7a of the first and second lug portions arranged in a position facing each other). Such a configuration can be obtained as a result of the plate-like structure of the lug, which is substantially flat, for example, obtained from sheet metal, by means of a folding of the second lug portion 4b through approximately 180° onto the first lug portion 4a.

Figure 11:
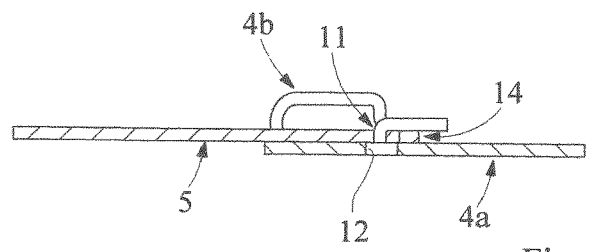
FIG. 11 is a cross-section along the line XI-XI of FIG. 9.
Figure 9:
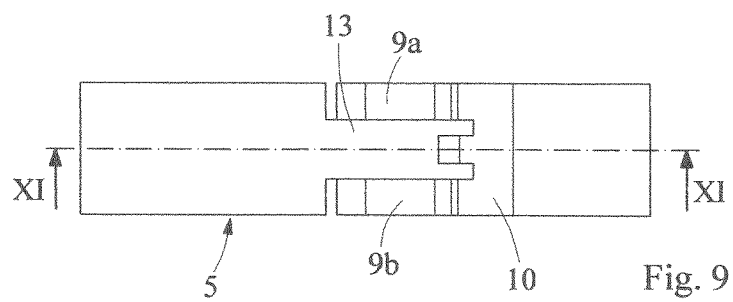

There is provided in the second lug portion 4b a first through-opening 8 which is laterally delimited by a pair of wings 9a, 9b which are parallel with and spaced apart from each other and in which they are connected to the free end of the second lug portion by a cross-member 10. There is designated 11 an extension piece which extends from the cross-member 10 inside the opening 8 in the direction of the first lug portion 4a. The extension piece 11 which is configured as a type of tooth-like formation extends from a central zone of the cross-member 10 with a first planar portion 11a thereof parallel with the cross-member which extends in a second portion 11b curved at right angles with respect to the first portion. The free end portion of that second portion 11b which projects from the plane of the cross-member 10 is capable of being received in the opening condition of the arm (FIGS. 3 and 11) in a recess 12 which is formed in the first lug portion, that recess preferably being produced so as to extend through the thickness of the lug itself (in particular through the first lug portion 4a). The provision of the recess 12, on the one hand, allows the production of the portion 11b of the extension piece 11 with an extent suitable for the function thereof and, on the other hand, allows the resilient return action between the first lug portion 4a and second lug portion 4b (with the cross-member 10 interposed therebetween) to be able to be applied without any interference, under all conditions between the open position and closure position of the arm. In a construction variant, it is possible to provide for the recess 12 to be constructed in the form of a simple surface lowered portion which is provided on the face 7a in the first lug portion 4a so as not to be visible from the outer side of the frame.

Figure 13:
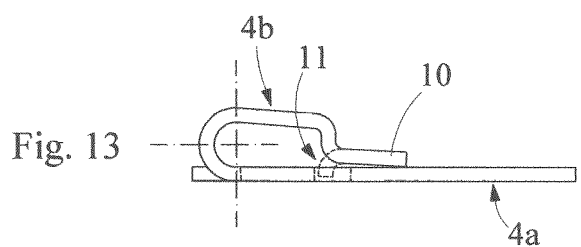
FIG. 13 is a front elevation of the component of FIG. 12.
Figure 14:
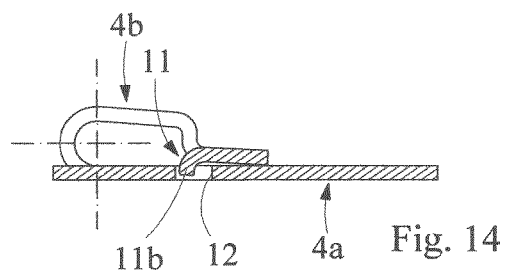
FIG. 14 is a cross-section along the line XIV-XIV of FIG. 12.
Figure 12:
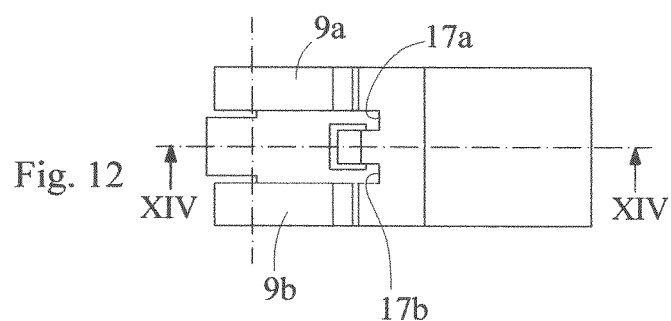
FIG. 12 is a side elevation of one of the components of the detail of the preceding Figures.

The cross-member 10 is further connected to the wings 9a, 9b by means of an "S"-like fold zone, as a result of which the wings 9a, 9b are spaced apart from the first lug portion, while the cross-member is in abutment, with supporting contact, against the first lug portion, as clearly shown in FIGS. 13 and 14. The arm 5 is mounted in an articulated manner on the lug 4 from the insertion of the free end 5a thereof, which is directed towards the lug, inside the through-opening 8 in the lug.

Figure 15:
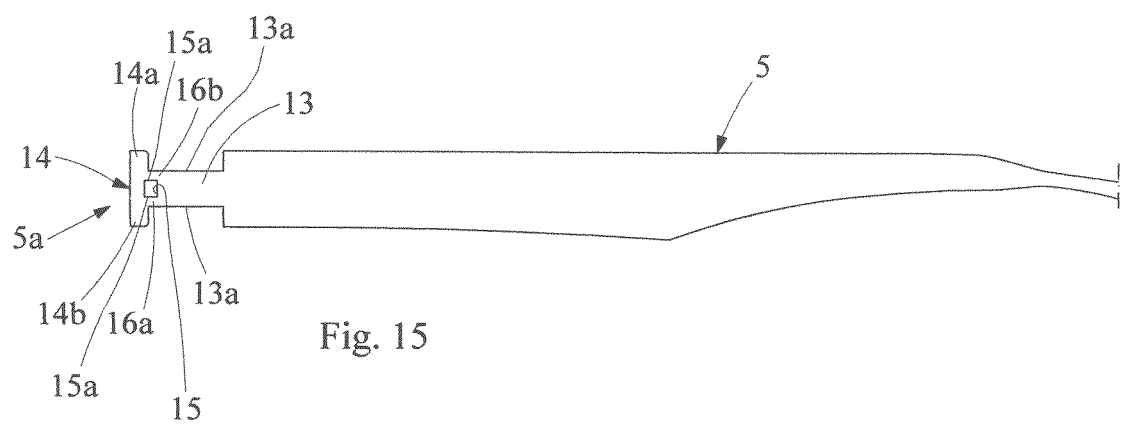
FIG. 15 is a partially sectioned side elevation of the other component of the detail of the preceding Figures.

More specifically, the arm comprises in the region of the end 5a thereof an arm portion 13 having dimensions in relation to the arm height which are less than the height of the arm body which is contiguous therewith, the portion extending in a head 14 having a widened end with respect to the portion itself. The head 14 is preferably provided with a pair of shoulders 14a, 14b which oppose each other and which project laterally from the portion 13, as clearly shown in FIG. 15. Such a formation may advantageously be obtained, for example, by removal of material from the arm body with cutting processing, by means of the provision of two opposing lateral members so that there are defined the shoulders 14a, 14b and the arm portion 13 with reduced height. In a connection zone between the head 14 and the portion 13, there is formed in the arm a through-opening which is designated 15 and the function of which will be clearly appreciated from the rest of the description. The opening 15 is provided in a central position in the arm portion 13 so as to delimit therein a pair of respective portions 16a, 16b, each of which is defined between a corresponding lateral edge 13a of the portion 13 and a respective lateral edge 15a of an end of the opening 15, which are adjacent to each other.

Figure 3:
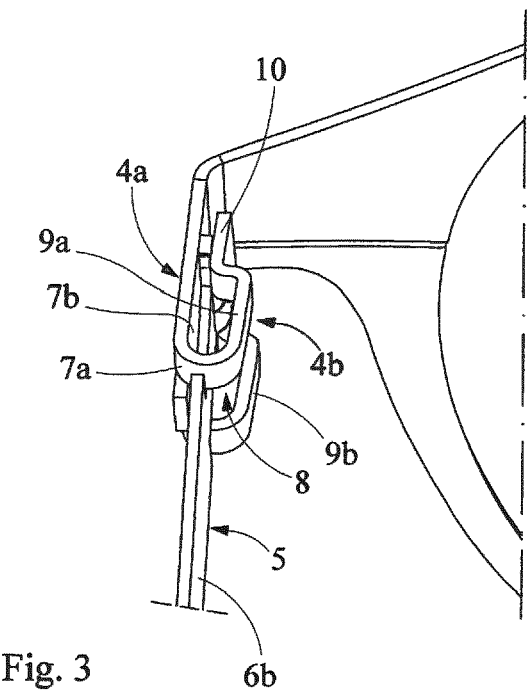
FIGS. 3 to 6 are perspective views of the detail of FIG. 2 shown in separate phases of the articulation movement of the arm relative to the lug of the frame.

During the assembly step of the arm on the lug, following the insertion into the opening 8, the end 5a of the arm remains interposed between the first and second lug portions 4a, 4b. The assembly provides for the arm portion 13 to be received (and to be transversely in abutment) with limited transverse connection play between the wings 9a, 9b in a configuration in which the head 14 is interposed between the cross-member 10 and the corresponding face 7a of the first lug portion 4a, and the extension piece 11 is also engaged, with limited connection play, in the opening 15. In order to achieve that configuration, the lug portions 4a, 4b are opened out from each other beforehand with subsequent resilient return into the above-mentioned position (FIG. 3). In this position, which refers to the open condition of the arm with respect to the front mount, the arm is stably retained on the lug. It is retained as a result of the engagement of the extension member 11 in the opening 15, as a result of the support and retention action of the arm portion 13 between the wings 9a, 9b and as a result of the effect of the urging of a resilient type applied by the lug to the head, brought about by the relative movement apart between the lug portions 4a, 4b.

Figure 4:
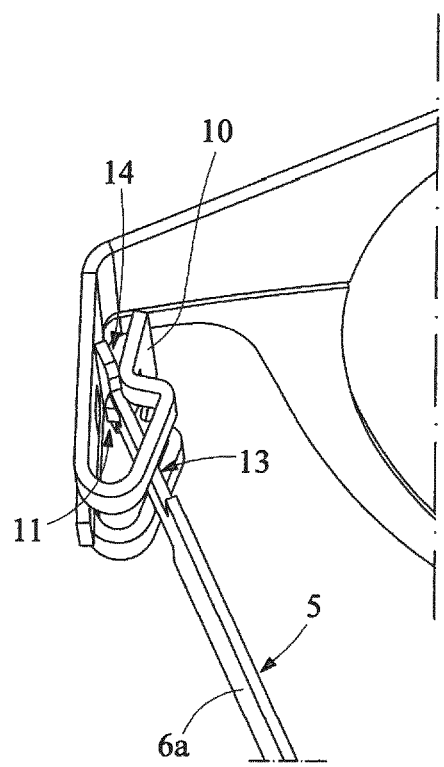
Figure 5:
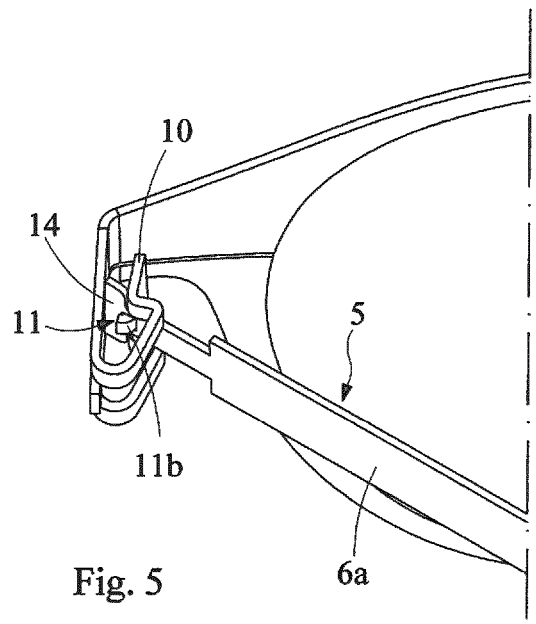
Figure 6:
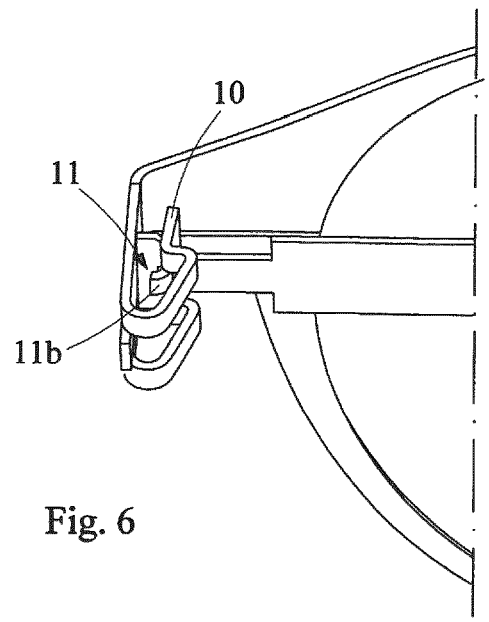

The relative support and retention action between the arm and the lug is further maintained during the movement of the arm towards the closure condition on the front (FIG. 6). During rotation of the arm, the arm portion 13 is moved towards and away from the open and closed positions in a guided manner and in abutment transversely between the opposing wings 9a, 9b, and at the same time the extension piece 11 is retained so as to be slidingly guided inside the opening 15, in order to produce a hinging movement between the lug and the arm. Furthermore, as a result of the relative sliding effect between the shoulders of the head and the cross-member, there is brought about a movement away from each other between the first and second lug portions so as to generate a resilient return urging action between the portions during the articulation movement. FIGS. 4 and 5 illustrate two different intermediate positions between the extreme opening and closure positions of the arm.

Figure 7:
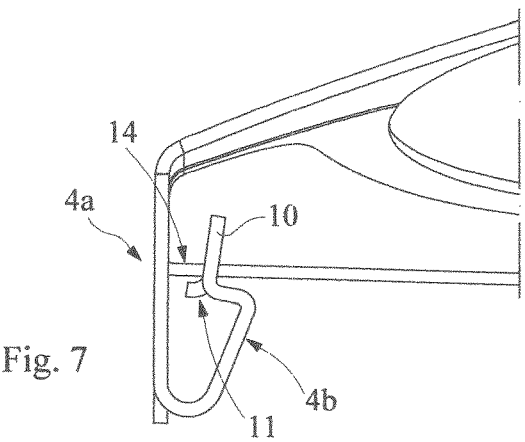
FIG. 7 is a top view of the detail which is depicted in the condition of FIG. 6, FIGS. 8 and 9 are a partial perspective view and side elevation of the detail depicted in the condition of FIG. 3, respectively.
Figure 8:
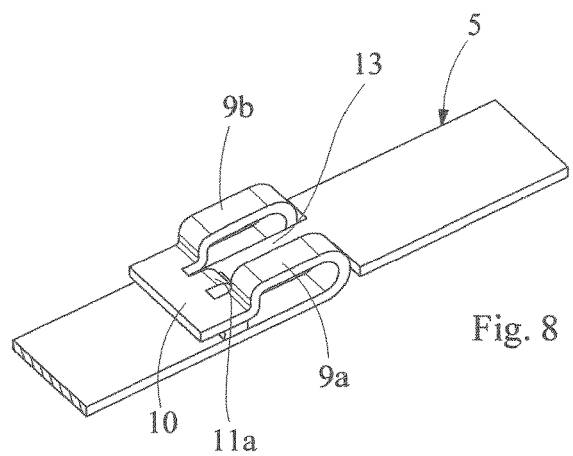
Figure 10:
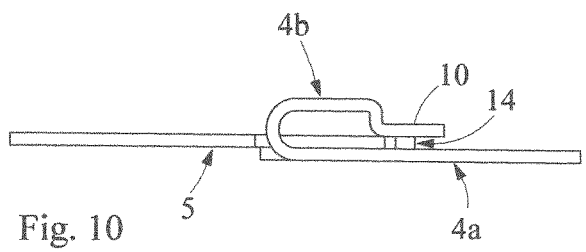
FIG. 10 is a front elevation of the detail of FIGS. 8 and 9.

Once the closure position of the arm illustrated in detail in FIGS. 6 and 7 is reached, the arm portion 13 is substantially directed perpendicularly to the first lug portion 4a, while the cross-member is moved away from the head to the greatest distance from the first lug portion. Furthermore, the arm portions 16a, 16b are moved until they engage with limited connection play with respective seats 17a, 17b which are defined between the extension piece 11 and each wing 9a, 9b, that connection ensuring a retention and lateral abutment action of the arm on the lug. The portion 11b of the extension piece further acts as limiting means for the oscillation of the arm when the head 14 of the arm is moved into abutment against the extension piece 11, thereby opposing undesirable movements of the arm.

Each of the seats 17a, 17b is delimited transversely by respective opposing surfaces of the corresponding wing 9a, 9b and the extension piece 11, which are capable of transversely abutting the corresponding portion 16a, 16b of the arm portion when the arm is moved into the closure position on the frame.

FIGS. 16 to 19 refer to a second embodiment of the articulation means 6 between the arm and the lug of the frame, in which details similar to those of the preceding embodiment are indicated with the same reference numerals.

Figure 16:
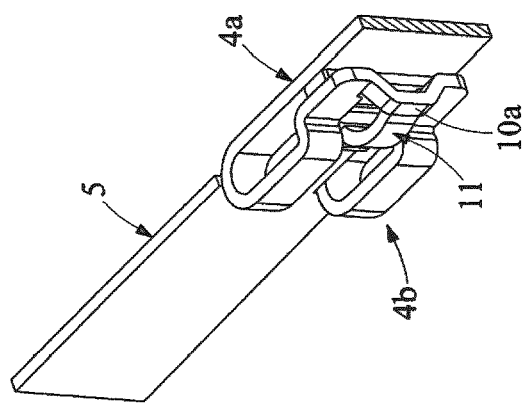
FIGS. 16 to 18 are perspective views of the detail of FIG. 8 in accordance with a second embodiment of the invention.
Figure 17:
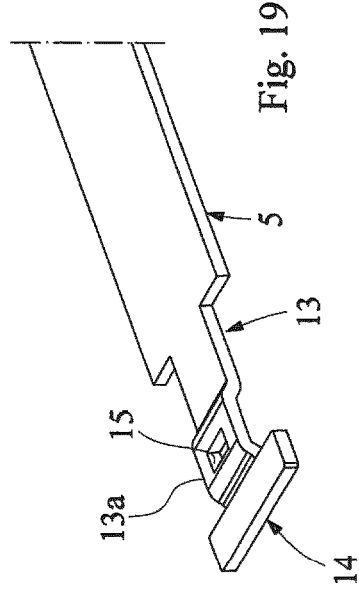

This embodiment differs from the one described above mainly in that there is not provided any recess in the first lug portion 4a, as clearly shown in FIG. 16. Such a prerogative which is found to be particularly advantageous because it does not involve the provision of recesses or openings which are clearly visible from the outer side, and therefore such as to impair the aesthetic line of the frame, is obtained by means of a different and specific formation of the extension piece 11 and the end of the arm 5a, as described in greater detail below.

There is provided in the cross-member 10 a central bridge-like portion 10a which projects with respect to the opposing ends of the cross-member and in a direction away from the first lug portion 4a. There extends from the central portion 10a the extension piece 11, in which the portions 11a and 11b extend, one in continuation of the other, along arcuate profiles having substantially equal curvature. Such a formation further provides for the free end of the portion 11b to be positioned substantially flush in respect of the surfaces of the wing portions 9a, 9b which are connected to the cross-member 10. It is thereby ensured that, before the insertion of the arm in the lug, the second lug portion 4b can be folded until it moves into abutment against the first portion 4a, without any interference of the extension piece 11.

Figure 18:
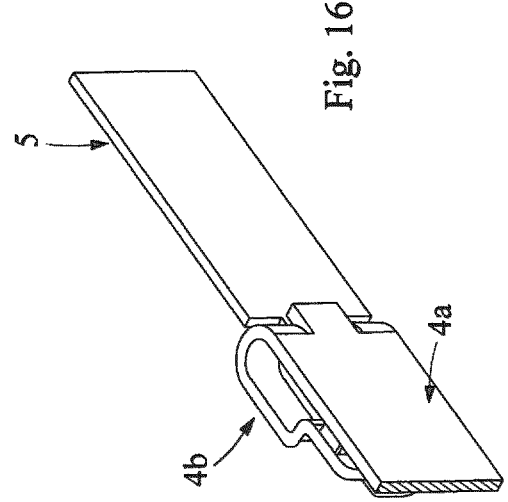
Figure 19:
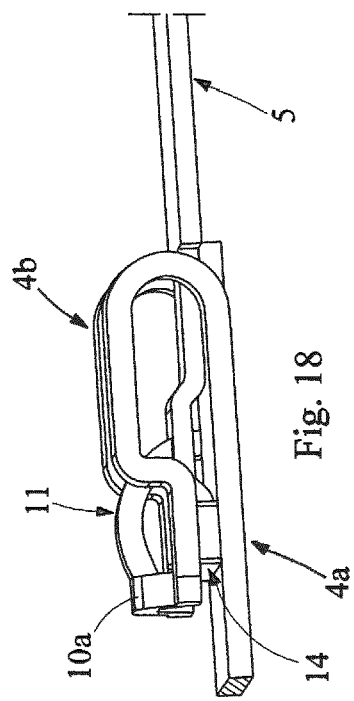
FIG. 19 is a partial perspective view of one of the components of the detail of FIGS. 16 to 18.

In a corresponding manner, there is provision in the arm portion 13 for the construction at the opening 15 of a bridge-like member 13a which projects from the plane of the arm so as to be moved away, at a predetermined distance, from the first lug portion 4a when the arm is mounted in the lug itself and is in the opening condition (FIG. 18). The bridge-like structure 13a ensures a suitable connection between the opening 15 and the extension piece 11 during the guided movement of the arm with respect to the lug in all conditions between the opening and closure positions of the arm, in a functionally generally similar manner to what is provided in the embodiment described above.

FIGS. 21 to 24 refer to an additional construction variant of the second embodiment described above, in which details similar to those of the preceding embodiment are indicated with the same reference numerals.

That variant differs in that the cross-member 10 of the lug has a flattened plate-like configuration, including in the central attachment zone of the extension piece 11. It has in the attachment portion 11a an extent with reduced curvature with respect to the contiguous portion 11b. The arm end 5a has in the region of the head 14 a bridge-like portion 14c which is raised with respect to the surface edge of the opposing shoulders 14a, b. The portion 14c is connected, remaining at the surface edge, to the portion of the arm portion 13a which is contiguous therewith and which is affected by the opening 15, as illustrated in FIG. 24.

Figure 25:
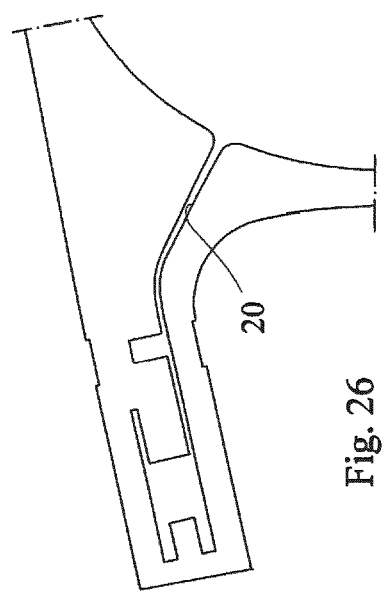
Figure 26:
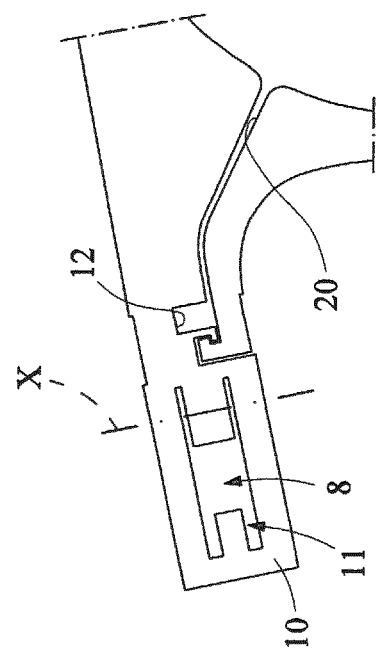
Figure 27:
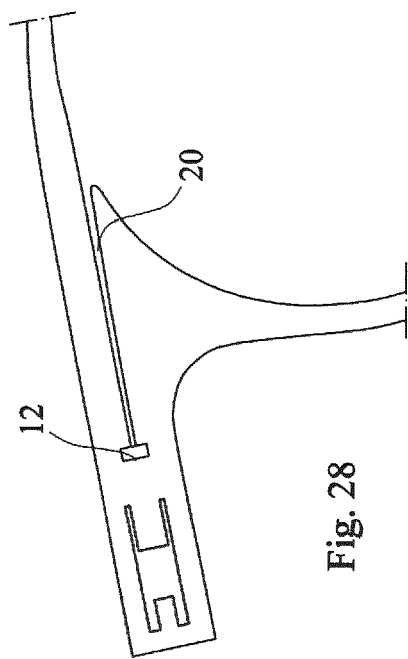
Figure 28:
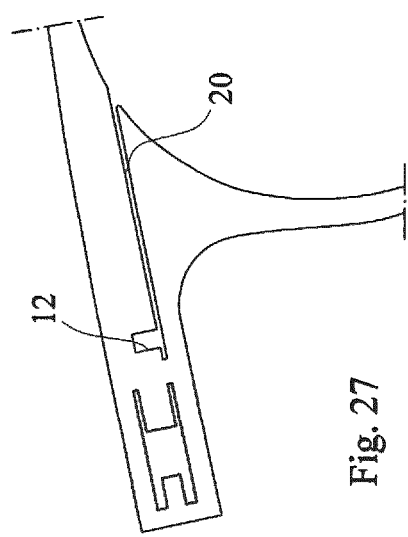
Figure 30:
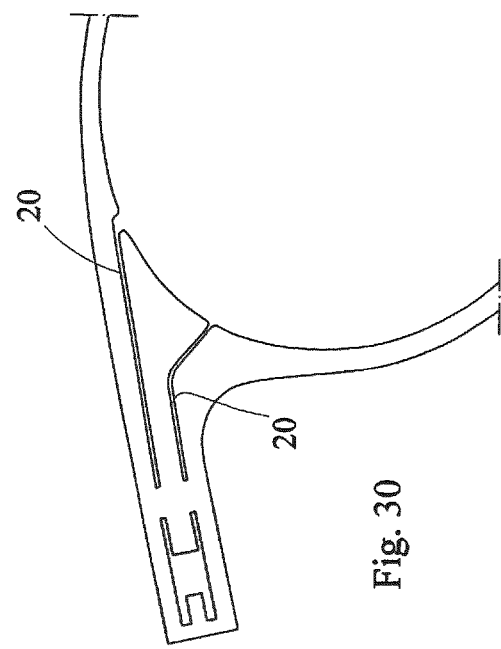
Figure 29:
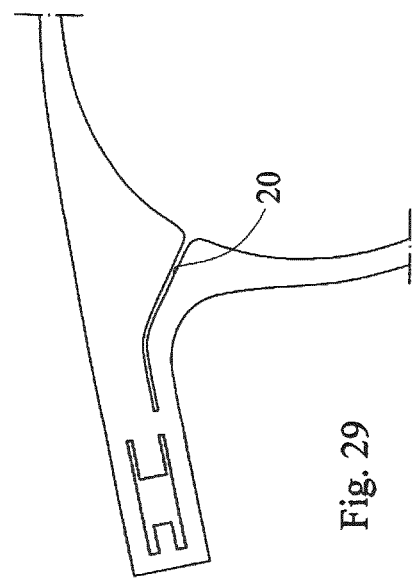
Figure 32:
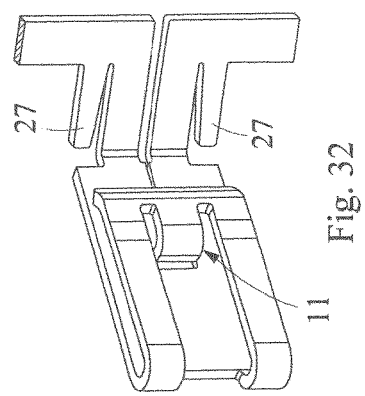
FIGS. 31 and 32 are perspective views of another construction variant of one of the components of the frame according to the invention.
Figure 36:
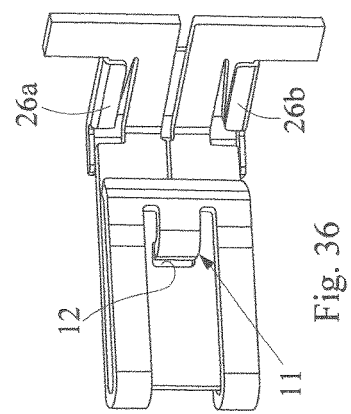
Figure 34:
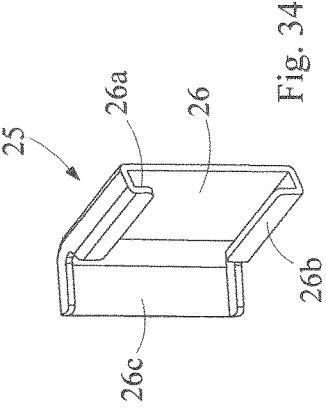
FIGS. 33 and 34 are perspective views of an accessory which is provided for connection to the detail of FIGS. 31 and 32, FIGS. 35 and 36 are perspective views of the detail of FIGS. 31 and 32 in a condition connected to the accessory of FIGS. 33 and 34.
Figure 31:
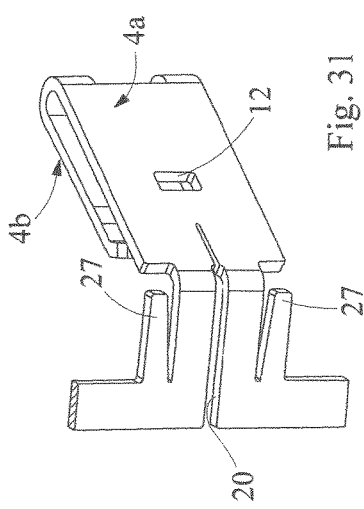
Figure 35:
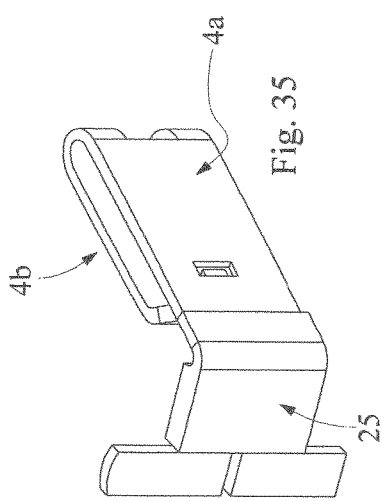
Figure 33:
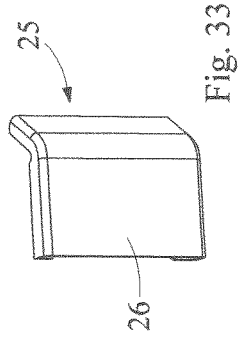

FIGS. 25 to 30 show respective configurations of the frame 1 according to the invention, to a degree limited to the zone of the lug 4 which extends from the front frame 2, wherein there is provided the shaping of the semi-processed plate-like member, from which by means of subsequent folding there is obtained the final shape of the lug. In FIG. 25, there is designated X the folding axis of the plate with approximate positioning with respect to the lug. There is designated 20 a through-slot through the thickness of the frame and extending along a cutting profile which originates from each of the lens-carrier rims of the mount, which are designated 3a, 3b, and which extends in the direction of the corresponding adjacent lug. As a result of that cutting profile, each lens-carrier rim may be within limits widened in order to allow the insertion of the corresponding lens, still ensuring the locking and retention of the lens with respect to the rim, by the effect of the resilient return action of the rim portions towards the non-deformed configuration. The resilient deformation and the consequent resilient return urging action are influenced by the type of material, the dimensions and thickness of the metal plate, the extent of the cutting action carried out and the formation and extent of the lens-carrier rims. In each specific configuration of the frame, it is possible to advantageously define the position and extent of the cutting profile which are suitable for making it easier to insert the lenses into the rims and to ensure an effective retention action of the lenses themselves.

If needed, there may further be provided an additional locking element in the form of a clip, of which an embodiment which is designated 25 is illustrated in FIGS. 31 to 35. The element comprises a main plate 26 which is provided with opposing lips 26a, b which are folded towards each other, the plate extending into a lateral portion 26c which has a smaller surface extent and which is angled with respect to the plate 26. The clip-fit element 25 is configured to be mounted on the lug, engaging with the respective lips, by means of a relative sliding movement, with a pair of corresponding and opposing extension pieces 27 provided on the lug. The extension pieces 27 are formed on the lug at opposite sides with respect to a slot 20 which is defined by the corresponding cutting profile. In that manner, as a result of the resilient deformation effect of the extension pieces 27, following the mounting of the clip-fit element, there is brought about an action of a resilient type which tends to move back together the lug portions which are separated by the slot 20, thereby making the locking and retention action applied by the respective rim to the corresponding lens more effective. In the presence of slots 20 with cutting profiles of limited longitudinal extent, which tend to limit the degree of resilience between the lug zones which extend so as to straddle the slot, the use of the clip-fit element 25 may be particularly effective both in terms of functionality because it improves the locking and retention action of the lens in the corresponding rim, and in terms of the pure aesthetics, because it covers from view, from the outer side of the frame, the slot produced by the cutting, so as to make the overall design of the arm more attractive.

The invention thereby achieves the objects set out, achieving a number of advantages with respect to known solutions.

A main advantage involves the fact that, within the scope of the articulation means of the arm without any hinge pin, there is obtained with the invention improved relative stability of connection between the arm and the lug during the entire movement of the arm in addition to in the extreme opening and closure positions on the frame.

Another advantage is that the particular operational features described above are obtained with a structure which is easy to assemble on the frame, has a particular lightness and limited dimensions, so as to also be able to be applied to particularly slender and light frames.

Yet another advantage involves the structural simplification and the limited number of components of the device, which are particularly suitable for constructing spectacles having generally extremely small dimensions and of a particularly light type.

The invention claimed is:

1. A frame for spectacles comprising a front mount (2) having respective lateral lugs (4) which are provided for the articulation of respective arms (5) for the purpose of producing an articulated connection of each arm (5) to the front mount (2), each lug (4) comprises a first lug portion (4a) which extends into a second lug portion (4b) which is folded on the first portion in a position facing the first portion, the second portion (4b) comprising a first through-opening (8) which is laterally delimited by a pair of opposing wings (9a, 9b) which are spaced apart from each other, the wings being connected at a free end of the second lug portion (4b) by a cross-member (10), an extension piece (11) which extends from the cross-member (10) inside the opening (8) and in the direction of the first lug portion (4a), each arm (5) comprises, in the region of the free end (5a) thereof directed towards the corresponding lug, an arm portion (13) which is extended into an end head (14), a second opening (15) being formed so as to extend through the arm portion (13) in the region of a connection zone between the arm portion (13) and the end head (14) of the arm, the arm portion (13) is received with limited transverse connection play between the wings (9a, 9b) and the extension piece (11) is engaged with limited connection play in the second opening (15) so that, during the movement between respective opening and closure positions of the arm (5) on the frame, the arm portion (13) can be moved away from and towards those positions, in a manner guided and in abutment transversely between the opposing wings (9a, 9b) of the second lug portion (4b), and the extension piece (11) is slidingly guided inside the second opening (15), in order to bring about a hinge movement between the lug (4) and the arm (5), and during the connection of each arm (5) to the corresponding lug (4), the end head (14) of an arm is interposed between the cross-member (10) and the first lug portion (4a) so that, as a result of the mutual movement apart of the first lug portion (4a) and second lug portion (4b) owing to the movement of the head (14) during the rotation movement of the arm (5), there is generated a resilient return urging action of the second lug portion (4b) towards the first lug portion (4a).

2. The frame according to claim 1, wherein there is delimited between the extension piece (11) and each of the wings (9a, 9b) a respective seat (17a, 17b) which is configured to receive, with limited connection play, a corresponding portion (16a, 16b) of the arm portion which is defined between a lateral edge (13a) of the arm portion (13) and a respective edge (15a) of the second opening (15), each of the seats (17a, 17b) being delimited transversely by respective opposing surfaces of the corresponding wing (9a, 9b) and the extension piece (11), which are configured to move transversely into abutment with the corresponding portion (16a, 16b) of the arm portion when the arm is moved into the closure position on the frame.

3. The frame according to claim 1, wherein the extension piece (11) has a free end which is folded towards the first lug portion (4a), the end of the extension piece (11) being configured to interfere with the head (14) of the arm by being positioned against the head in the region of a predetermined maximum angulation which is allowed for the arm at the closure position on the frame.

4. The frame according to claim 1, wherein each of the lugs (4) is formed from a plate-like structure, the second lug portion (4b) being folded substantially through 180° on the first lug portion (4a).

5. The frame according to claim 4, wherein at least the free arm end is of plate-like form.

6. The frame according to claim 5, wherein each lug (4), at least the free end of the arm (5), or both each lug (4) and at least the free end of the arm (5) are formed from a plate of metal material.

7. The frame according to claim 1, wherein there is provided in the first portion (4a) of each lug (4) a respective recess (12) which is capable of receiving, at least partially, the free end of the extension piece (11) when the arm is rotated into the opening position with respect to the frame.

8. The frame according to claim 7, wherein the recess (12) is produced in the form of a through-opening through the first lug portion (4a).

9. The frame according to claim 1, wherein the first lug portion (4a), the cross-member (10) and the arm head (14) are arranged with mutual surface superimposition in the condition of the open arm, the arm head (14) being capable of relative movement with respect to the cross-member (10), counter to the resilient return action applied by the second lug portion (4b) until there is reached a configuration in which the head (14) of the arm is arranged to be substantially perpendicular to the cross-member (10), at a closure condition of the arm (5) on the frame.

10. The frame according to claim 1, wherein the extension piece (11) is constructed in the form of a tooth which projects from the cross-member (10) in the direction of the first lug portion (4a).

11. The frame according to claim 1, wherein the end head (14) of the arm has a transverse spatial requirement dimension which is increased with respect to the arm portion (13) and comprises a pair of shoulders (14a, 14b), which oppose each other and which project transversely from the arm portion (13).

12. The frame according to claim 1, wherein the front mount (2) comprises respective lens-carrier rims (3a, 3b), the contour profile of each rim (3a, 3b) being opened by means of the provision of a through-slot (20) which is provided in the front mount (2) and which extends from the respective rim (3a, 3b) in the direction of the corresponding lateral lug (4) adjacent thereto, the slot (20) being defined by a profile having a cut extending through the transverse frame thickness.

13. The frame according to claim 12, wherein there is provided a clip-fit element (25) which is configured to connect with respect to the respective lateral lug (4) in order to urge, one against the other, lug portions separated by the slot (20), for a stable retention action of the lenses in the respective lens-carrier rims (3a, 3b) of the frame.

* * * * *